United States Patent
Fukuizumi

(10) Patent No.: US 7,741,801 B2
(45) Date of Patent: Jun. 22, 2010

(54) AUTOMATIC OPENING/CLOSING TRASH BIN LID FOR LAVATORY UNIT OF AIRCRAFT

(75) Inventor: Masahito Fukuizumi, Tokyo (JP)

(73) Assignee: Jamco Corporation, Tokyo (JP)

( * ) Notice: Subject to any disclaimer, the term of this patent is extended or adjusted under 35 U.S.C. 154(b) by 678 days.

(21) Appl. No.: 11/010,386

(22) Filed: Dec. 14, 2004

(65) Prior Publication Data
US 2005/0258794 A1 Nov. 24, 2005

(30) Foreign Application Priority Data
May 24, 2004 (JP) ............... 2004-152748

(51) Int. Cl.
*H02P 1/04* (2006.01)
(52) U.S. Cl. ............... 318/480; 318/264; 318/265; 318/266; 318/280; 318/283; 220/260; 220/263
(58) Field of Classification Search ............ 318/480, 318/264, 265, 266, 280, 283; 220/280, 283
See application file for complete search history.

(56) References Cited

U.S. PATENT DOCUMENTS

| | | | | |
|---|---|---|---|---|
| 3,891,115 A | * | 6/1975 | Ono ............... | 220/260 |
| 4,996,467 A | * | 2/1991 | Day ............... | 318/480 |
| 5,175,918 A | * | 1/1993 | Christopher ......... | 29/434 |
| 5,329,212 A | * | 7/1994 | Feigleson ........... | 318/16 |
| 5,770,935 A | * | 6/1998 | Smith et al. ........ | 318/480 |
| 6,211,637 B1 | * | 4/2001 | Studer .............. | 318/466 |
| 6,596,983 B2 | * | 7/2003 | Brent .............. | 250/221 |
| 6,774,586 B1 | * | 8/2004 | Shih ............... | 318/9 |

FOREIGN PATENT DOCUMENTS

| | | |
|---|---|---|
| EP | 0 903 305 A1 | 3/1999 |
| EP | 1 279 614 A1 | 1/2003 |
| JP | 08-20405 | 1/1996 |
| JP | 08-081004 | 3/1996 |
| JP | 11-318766 | 11/1999 |

OTHER PUBLICATIONS

European search report dated Oct. 11, 2006 in EP 04 02 9653.

* cited by examiner

*Primary Examiner*—Bentsu Ro
*Assistant Examiner*—Erick Glass
(74) *Attorney, Agent, or Firm*—Westerman, Hattori, Daniels & Adrian, LLP

(57) ABSTRACT

The invention provides a device for automatically opening and closing a lid of a trash bin in noncontact fashion disposed in a lavatory unit of an aircraft. On the upper portion of a trash bin 100 disposed in a lavatory unit of an aircraft is attached a lid 50 that pivots via a shaft 250. The reflective infrared radiation sensor 200 attached to a lid frame 60 irradiates infrared radiation IR and detects an object. When the object is detected, a control means drives the DC motor 220 to pivot the shaft 250 via a rotating lever 240 and link arms 242 and 244 to open the lid 50 downward. The fully closed state and the fully opened state of the lid 50 can be detected by position detecting sensors 260 and 262.

4 Claims, 4 Drawing Sheets

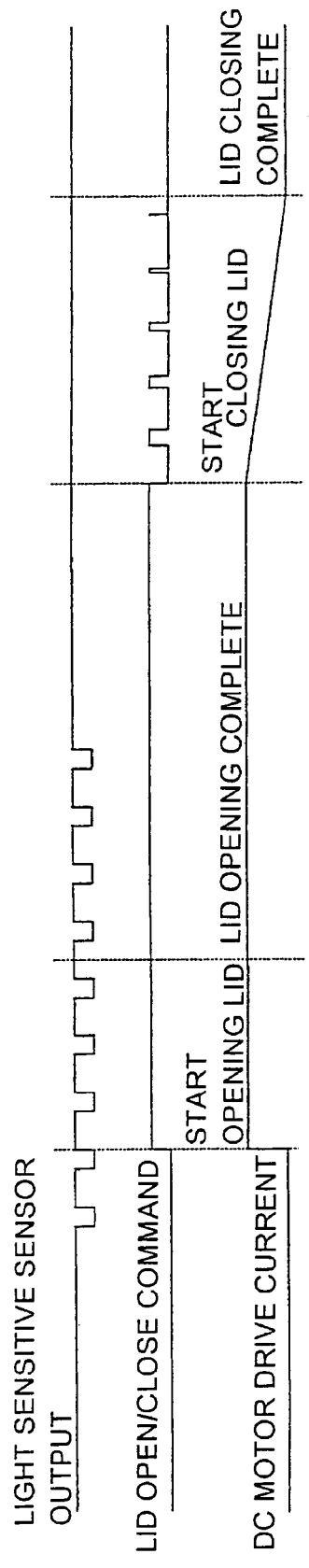

AUTOMATIC OPENING/CLOSING TRASH BIN LID FOR LAVATORY UNIT OF AIRCRAFT

The present application is based on and claims priority of Japanese patent application No. 2004-152748 filed on May 24, 2004, the entire contents of which are hereby incorporated by reference.

BACKGROUND OF THE INVENTION

1. Field of the Invention

The present invention relates to an automatic opening/closing trash bin lid equipped in a lavatory unit of an aircraft.

2. Description of the Related Art

A lavatory unit of an aircraft is equipped with a stool, a wash basin, a trash bin and so on.

The lid of a trash bin in the lavatory unit of an aircraft that is used by an unspecified number of passengers should preferably be opened and closed in a noncontact fashion for sanity reasons.

Japanese Patent Laid-Open Publication No. 08-020405 (patent document 1) discloses a mechanism for opening and closing a bottom cover of a refuse (trash) bin that can be operated single-handedly. Further, Japanese Patent Laid-Open Publication No. 11-318766 (patent document 2) discloses an automatic closing apparatus of a stool cover using an infrared sensor.

The trash bin and the like equipped in an aircraft is required by law to have a function to prevent fire from spreading. According to this function, when a fire occurs inside the trash bin, the trash bin is airtightly closed to cut the inflow of fresh air into the bin to thereby automatically extinguish the fire.

SUMMARY OF THE INVENTION

Therefore, the present invention provides an automatic opening/closing trash bin lid for a lavatory unit of an aircraft that satisfies the above-described function that can be opened and closed in a noncontact fashion using an infrared radiation sensor and a motor.

The automatic opening/closing trash bin lid equipped in a lavatory unit of an aircraft of the present invention comprises a pivotable lid covering a trash passage of a trash bin, a reflective infrared radiation sensor disposed on an upper portion of a lid frame, a means for driving a pivoting shaft of the lid via a link arm and a rotating lever connected to a motor and an output shaft of the motor, a control means for outputting a command to the motor when the reflective infrared radiation sensor detects an object, a sensor for sensing a fully closed position and a fully opened position of the lid, and a spring attached to the pivoting shaft of the lid for biasing the lid toward the fully closed position.

Further, when the lid is returned to the fully closed position by a spring force of the spring, the control means controls the motor to generate a torque smaller than the spring force.

Even further, the sensor region of the reflective infrared radiation sensor is set to have an angle of incidence with respect to a plane of the lid at its fully closed position.

According to the present invention, the lid on the trash bin in the lavatory unit used by a large number of passengers can be opened and closed without contact, which is sanitary. Moreover, since the lid can be airtightly closed constantly, the effect of preventing fire in the trash bin is enhanced.

BRIEF DESCRIPTION OF THE DRAWINGS

FIG. 6 is a time chart showing the operation of the present invention.

DETAILED DESCRIPTION OF THE PREFERRED EMBODIMENTS

Figure 1:
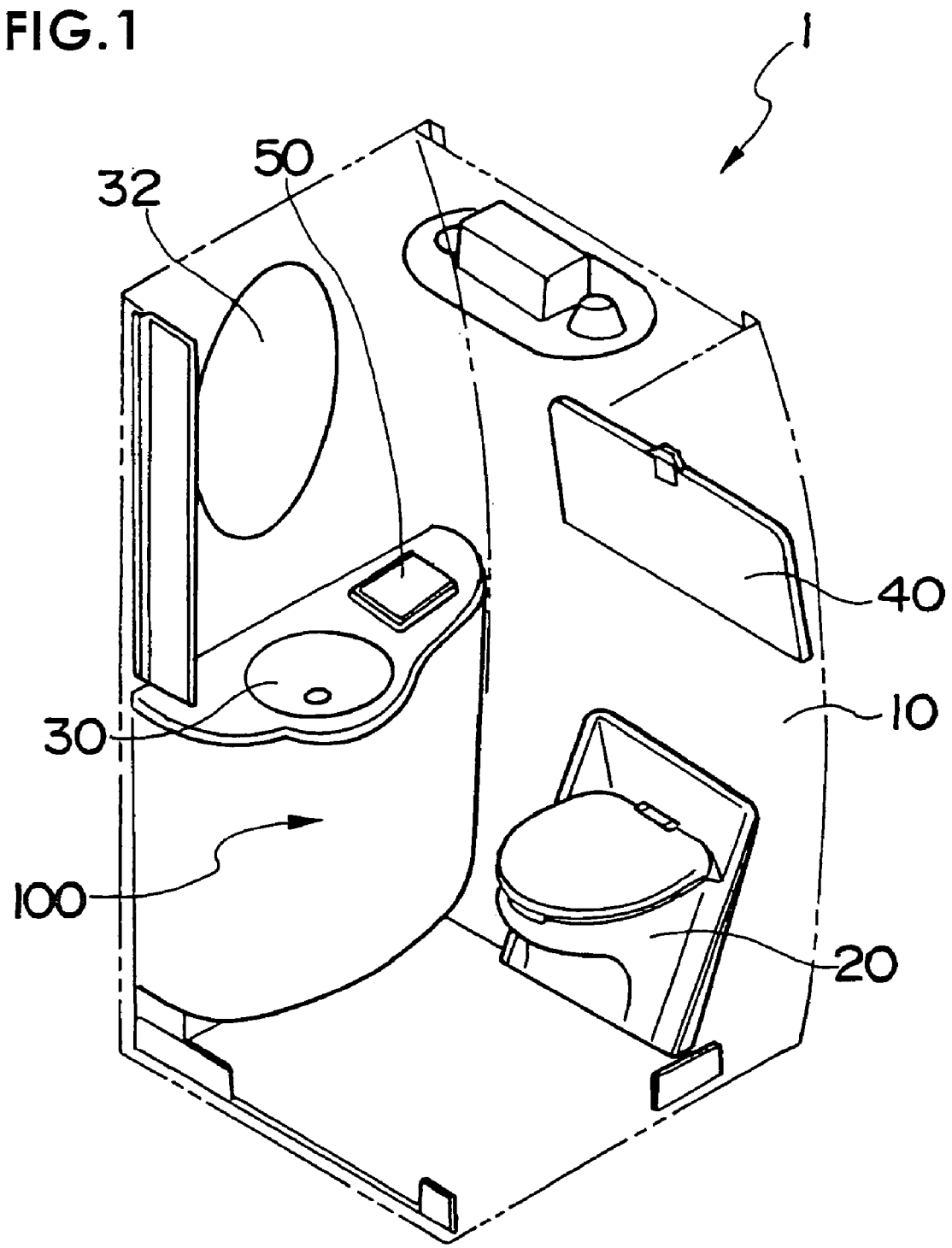
FIG. 1 is an explanatory view showing the general structure of a lavatory unit of an aircraft to which the present invention is applied.

FIG. 1 is an explanatory view showing a general outline of a lavatory unit of an aircraft in which the present invention is applied.

A lavatory unit, the whole of which being denoted by reference number 1, is structured using panel members, and shaped so as to correspond to the location of installation in the aircraft.

A stool 20, a wash basin 30, a mirror 32, an auxiliary folding bed 40 and so on are equipped inside the lavatory unit 1.

A trash slot lid 50 is disposed next to the wash basin 30, through which trashes such as tissue papers are thrown in. The trash slot lid 50 is a hinged door that opens downward, and below the lid 50 is disposed a trash bin 100.

Figure 2:
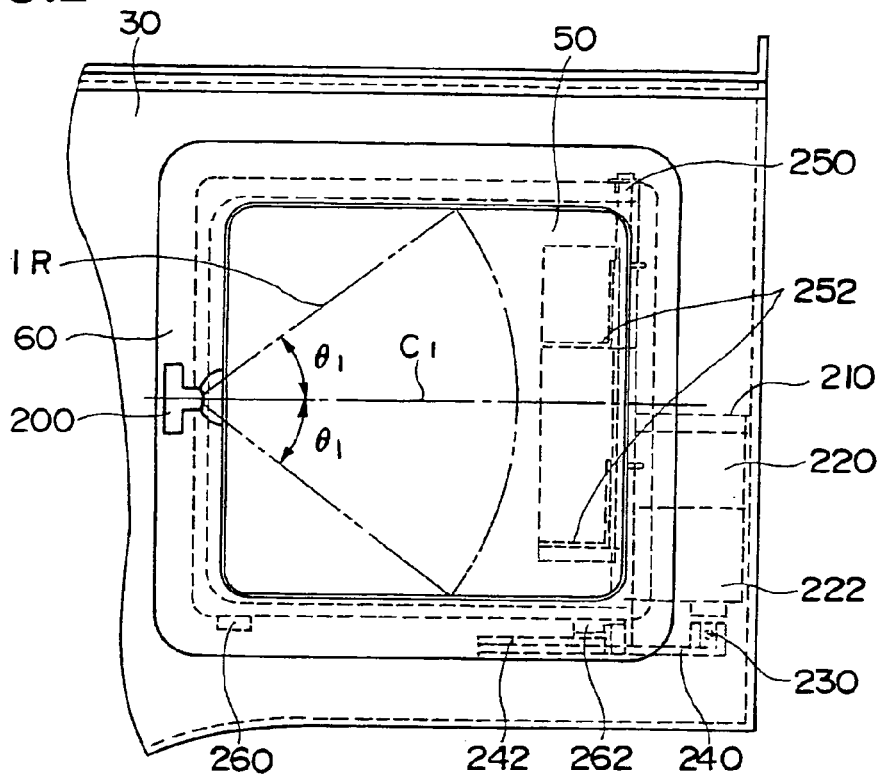
FIG. 2 is a plan view of an automatic opening/closing trash bin lid for a lavatory unit of an aircraft according to the present invention.
Figure 3:
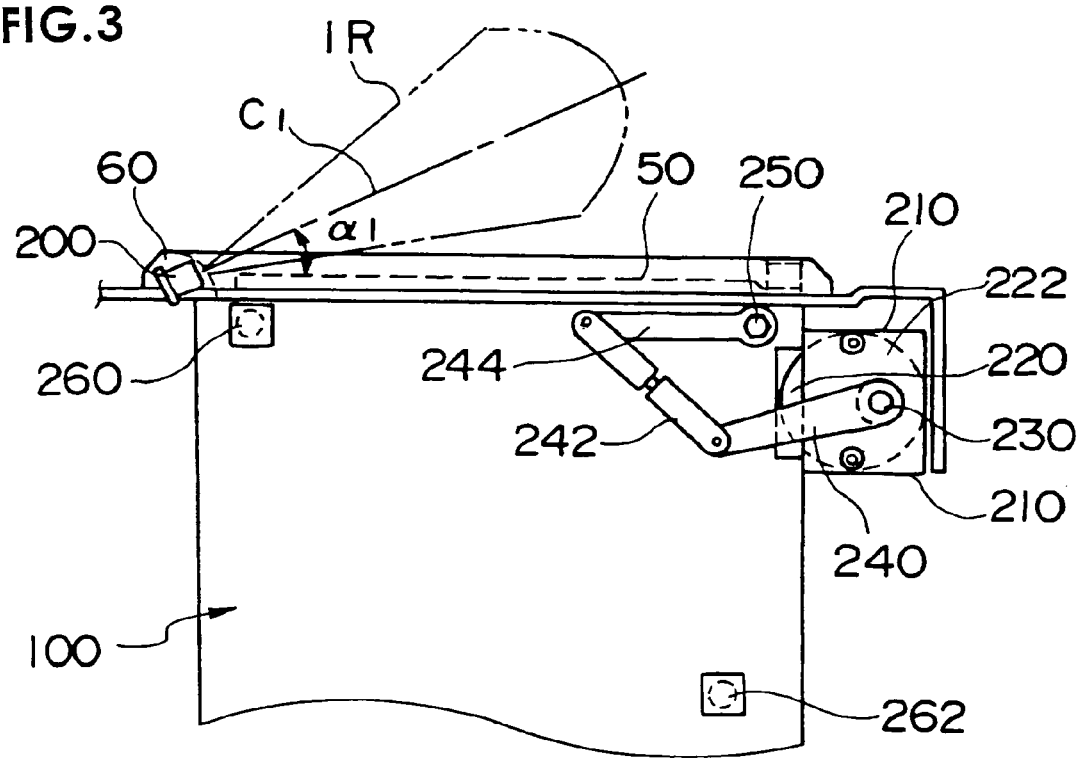
FIG. 3 is a side view of the automatic trash bin lid for a lavatory unit of an aircraft according to the present invention.

FIG. 2 is a plan view of an automatic opening/closing trash bin lid according to the present invention, and FIG. 3 is a front view thereof, showing the state in which the lid is at its fully closed position.

The trash bin lid 50 is disposed pivotably via a shaft 250 positioned inside a lid frame 60 attached on top of the wash basin 30.

A reflective infrared radiation sensor 200 is disposed on an upper portion of the lid frame 60 opposite to the shaft 250.

The reflective infrared radiation sensor 200 is composed of a light emitting element and a light sensitive element.

The reflective infrared radiation sensor 200 irradiates infrared radiation IR to the area above the lid frame covering the trash slot of the trash bin 100, and is equipped with a function to sense and generate a signal when an object, such as a hand of a user, enters that radiation range.

The reflective infrared radiation sensor 200 is positioned so that a center $C_1$ of IR (infrared radiation) of the IR wave region has an angle of incidence positioned upward by angle $\alpha_1$ from the horizontal plane of the lid 50 at its fully closed position.

Further, the IR waves are expanded to left and right sides in the horizontal plane from the center of IR waves by angle $\theta_1$, respectively, covering both sides of the inner area of the lid frame 60.

A casing 210 is disposed under the wash basin 30 opposing to the reflective infrared radiation sensor 200, and a DC motor 220 and a gear box 222 for reducing the speed of output of the DC motor 220 are disposed in the casing.

A control means not shown generates an output command to the motor upon receiving the signal from the infrared radiation sensor.

A rotating lever 240 is attached to an output shaft 230 of the gear box 222, and the rotating lever 240 pivots the lid 50 around the shaft 250 via link arms 242 and 244.

The position of the lid 50 is detected by two position detecting sensors 260 and 262.

Figure 4:
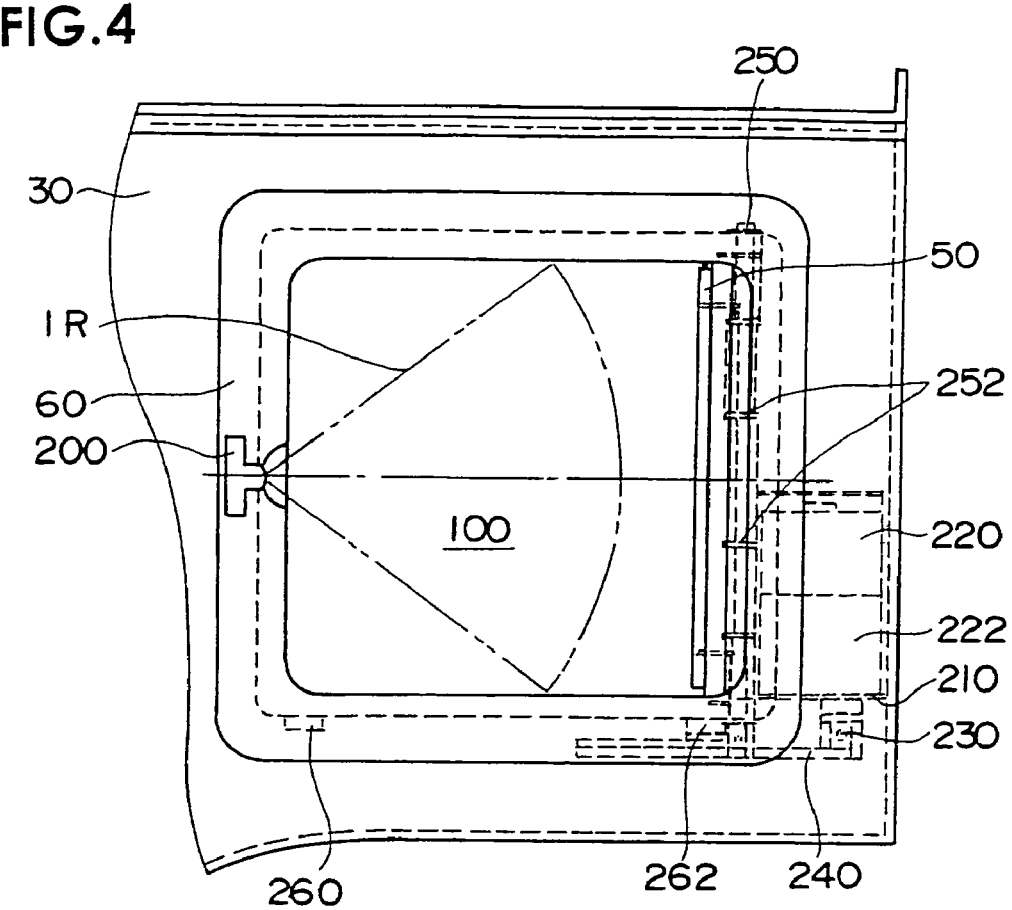
FIG. 4 is a plan view of an automatic trash bin lid for a lavatory unit of an aircraft according to the present invention.
Figure 5:
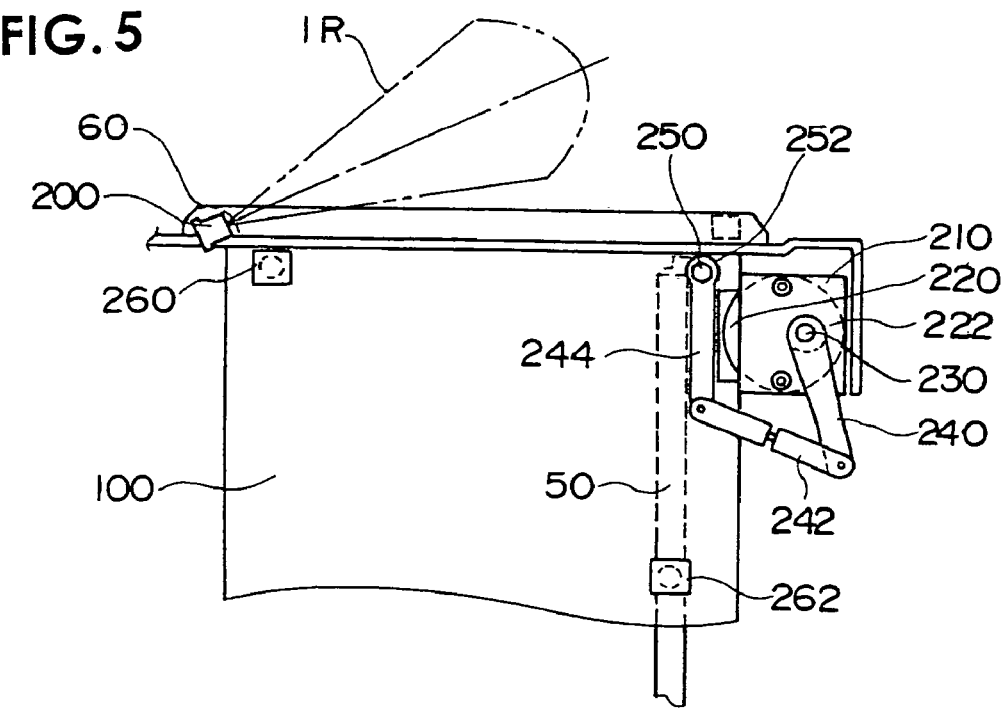
FIG. 5 is a side view of the automatic trash bin lid for a lavatory unit of an aircraft according to the present invention.

FIGS. 4 and 5 show the lid 50 in its fully opened position.

The lid 50 is driven by the DC motor 220 to open to its fully opened position, and when the lid is in contact with the wall of the trash bin, the rotation stops due to overload.

When the throw-in of trash is ended and the hand of the user etc. is drawn away from the IR wave region, the power to the DC motor 220 is turned off, and the lid 50 returns to its fully closed position due to the spring force of the spring 252.

At this time, by controlling the power supply to the DC motor 220 to be gradually reduced, the DC motor can function as a damper to prevent the generation of collision noise.

The time chart of FIG. 6 is referred to in explaining the operation of the present invention.

The reflective infrared radiation sensor 200 disposed inside the lid frame 60 radiates IR waves toward the center of the trash bin lid 50, and detects the reflection from the object by the light-sensitive element. The detection pulse is sent to a microcomputer, and upon receiving the detection pulse, the microcomputer outputs a lid open command.

When the lid open command is output, the DC motor 220 is activated. When the DC motor 220 rotates, the connected gear box 222 shifts the transmission to a low-speed rotation, and thereafter, the trash bin lid 50 is pulled downward via the rotating lever 240. The DC motor 220 stops rotating due to overload when the lid contacts the wall of the trash bin. The driving current fed to the DC motor 220 is at constant value, and the lid is stopped at that position.

When the object moves away from the trash bin lid 50, the detection pulse from the reflective infrared radiation sensor 200 stops, and the microcomputer outputs a close command to a constant current drive circuit connected to the DC motor 220, by which the current in the constant current drive circuit becomes intermittent. The spring force of the spring 252 is used as the power for closing the trash bin lid 50. Therefore, the trash bin lid 50 can be closed by spring force even during power failure. If the trash bin lid 50 is closed only by spring force, however, the lid will close with a bang, generating unpleasant noise, so the present invention provides a damping mechanism in which the current of the DC motor 220 becomes intermittent so that the spring force is slightly stronger during closing action of the lid 50.

When an obstacle is left unattended near the trash bin lid 50, the lid may become opened at all times. In such case, the lid can be set to close automatically after being opened for a few seconds.

Thereafter, the obstacle should be moved outside of the IR wave range in order to restore automatic open/close operation.

Moreover, the two position detecting sensors 260 and 262 disposed on the outer side wall of the trash bin 100 are for detecting whether the trash bin lid 50 is fully closed and for detecting whether the lid is fully opened, respectively. It is possible to use these position detecting sensors 260 and 262 to output a warning to notify the cabin crew when the opening/closing of the trash bin lid 50 is stopped midway due to clogging of trash or other troubles.

What is claimed is:

1. An automatic opening/closing trash bin lid equipped in a lavatory unit of an aircraft, comprising:
    a pivotable lid covering a trash passage of a trash bin;
    a reflective infrared radiation sensor disposed on an upper portion of a lid frame;
    a means for driving a pivoting shaft of the lid via a link arm and a rotating lever connected to a motor and an output shaft of the motor;
    a control means for outputting a command to the motor when the reflective infrared radiation sensor detects an object;
    a sensor for sensing a fully closed position and a fully opened position of the lid; and
    a spring attached to the pivoting shaft of the lid for biasing the lid toward the fully closed position,
    wherein said pivotable lid opens downward, and
    wherein said lid is air tightly closed when in the fully closed position.

2. The automatic opening/closing trash bin lid equipped in a lavatory unit of an aircraft according to claim 1, wherein when the lid is returned to the fully closed position by a spring force of the spring, the control means controls the motor to generate a torque smaller than the spring force.

3. The automatic opening/closing trash bin lid equipped in a lavatory unit of an aircraft according to claim 1, wherein a sensor region of the reflective infrared radiation sensor is set to have an angle of incidence with respect to a plane of the lid at its fully closed position.

4. An automatic opening/closing trash bin lid equipped in a lavatory unit of an aircraft, comprising:
    a pivotable lid covering a trash passage of a trash bin;
    a reflective infrared radiation sensor disposed on an upper portion of a lid frame;
    a means for driving a pivoting shaft of the lid via a link arm and a rotating lever connected to a motor and an output shaft of the motor;
    a control means for outputting a command to the motor when the reflective infrared radiation sensor detects an object;
    a sensor for sensing a fully closed position and a fully opened position of the lid; and
    a spring attached to the pivoting shaft of the lid for biasing the lid toward the fully closed position,
    wherein said pivotable lid opens downward,
    wherein said lid is air tightly closed when in the fully closed position,
    wherein when the lid is returned to the fully closed position by a spring force of the spring, the control means controls the motor to generate a torque smaller than the spring force, and
    wherein a sensor region of the reflective infrared radiation sensor is set to have an angle of incidence with respect to a plane of the lid at its fully closed position.

* * * * *